(12) United States Patent
Matsuoka

(10) Patent No.: US 8,588,094 B2
(45) Date of Patent: Nov. 19, 2013

(54) COMPUTER-READABLE MEDIUM STORING TEST ENVIRONMENT CREATION PROGRAM, TEST ENVIRONMENT CREATION METHOD, AND TEST DEVICE

(75) Inventor: Naoki Matsuoka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 302 days.

(21) Appl. No.: 13/007,114

(22) Filed: Jan. 14, 2011

(65) Prior Publication Data

US 2011/0176441 A1 Jul. 21, 2011

(30) Foreign Application Priority Data

Jan. 21, 2010 (JP) .................................. 2010-10900

(51) Int. Cl.
*H04L 12/26* (2006.01)
(52) U.S. Cl.
USPC ........................................................ 370/252
(58) Field of Classification Search
None
See application file for complete search history.

(56) References Cited

U.S. PATENT DOCUMENTS

| 8,149,730 | B1* | 4/2012 | Aybay et al. | 370/253 |
| 2003/0028828 | A1* | 2/2003 | Kakimoto | 714/47 |
| 2010/0198960 | A1* | 8/2010 | Kirschnick et al. | 709/224 |
| 2011/0022812 | A1* | 1/2011 | van der Linden et al. | 711/163 |
| 2011/0078303 | A1* | 3/2011 | Li et al. | 709/224 |
| 2012/0218901 | A1* | 8/2012 | Jungck et al. | 370/241 |

FOREIGN PATENT DOCUMENTS

JP 1-152545 6/1989

* cited by examiner

*Primary Examiner* — Anh-Vu Ly
(74) *Attorney, Agent, or Firm* — Fujitsu Patent Center

(57) ABSTRACT

A test device includes a virtual machine. The device has a virtual bridge which, when receiving a packet transmitted from the virtual machine to a computer connected via a network, transmits the packet to the computer via a physical interface of the test device. The device has a load generating unit for generating a first packet that provides a communication load and transmitting the generated first packet to the virtual bridge. The device has a return unit for receiving the generated first packet from the virtual bridge, not transmitting the generated first packet to the computer, returning the first packet to the second virtual machine by changing a destination address, and terminating the transmission.

16 Claims, 19 Drawing Sheets

FIG. 13

|  | τ1 | τ2 | τ3 | τ4 | ... |
|---|---|---|---|---|---|
| CPU LOAD OF DATABASE | 10% | 12% | 15% | 24% | |
| LOAD OF LOAD GENERATING PROGRAM NECESSARY FOR GENERATING LOAD | 2% | 3% | 4% | 6% | |
| PROCESSING AMOUNT FOR GENERATING LOAD (THE NUMBER OF CALCULATION LOOPS) | 100 (FOR 8%) | 110 (FOR 9%) | 130 (FOR 11%) | 220 (FOR 18%) | |

COMPUTER-READABLE MEDIUM STORING TEST ENVIRONMENT CREATION PROGRAM, TEST ENVIRONMENT CREATION METHOD, AND TEST DEVICE

CROSS-REFERENCE TO RELATED APPLICATIONS

This application is based upon and claims the benefit of priority of the prior Japanese Patent Application No. 2010-10900, filed on Jan. 21, 2010, the entire contents of which are incorporated herein by reference.

FIELD

The embodiments discussed herein are related to a technique for testing a communication status between devices.

BACKGROUND

Recently, a cloud environment, which allows a user to use a plurality of computer resources on a network as his or her own computing resources, has been attracting attention. To use a cloud environment, it is necessary to conduct a performance evaluation or performance tuning of a virtual ICT (Information and Communication Technology) system created on the cloud environment (see Japanese Laid-open Patent Publication No. H1-152545).

Conventionally, as shown in FIG. 1, when conducting a performance evaluation or performance tuning of the above system, a local test environment is created instead of a cloud environment. Then, the performance evaluation and the performance tuning are conducted on an ICT system to be tested while adding a primary load to the ICT system from a physical or a virtual load generator (a measuring device or a load generation program). Thereafter, in the conventional method, the ICT system is moved to a cloud environment.

In addition, as shown in FIG. 2, there is a method in which the ICT system is directly created in a cloud environment without creating the ICT system in a local environment. In this method, the performance evaluation and the performance tuning are conducted on the ICT system to be tested while adding a primary load from a virtual load generator (a load generation program on a virtual machine).

SUMMARY

According to an aspect of the invention, a test device includes a virtual machine. The device has a virtual bridge which, when receiving a packet transmitted from the virtual machine to a computer connected via a network, transmits the packet to the computer via a physical interface of the test device. The device has a load generating unit for generating a first packet that provides a communication load and transmitting the generated first packet to the virtual bridge. The device has a return unit for receiving the generated first packet from the virtual bridge, not transmitting the generated first packet to the computer, returning the first packet to the second virtual machine by changing a destination address, and terminating the transmission.

The object and advantages of the invention will be realized and attained by the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 13 is a diagram showing an example of the load information database according to the second embodiment.

DESCRIPTION OF EMBODIMENTS

Embodiments to implement the present invention will be described with reference to the drawings. However, before describing the embodiments, issues relating to the conventional techniques described in the background section are noted.

In a cloud environment, a plurality of virtual ICT systems share physical computing resources and network resources, so that the system to be tested is affected by secondary loads generated from other ICT systems that share the resources.

Figure 1:
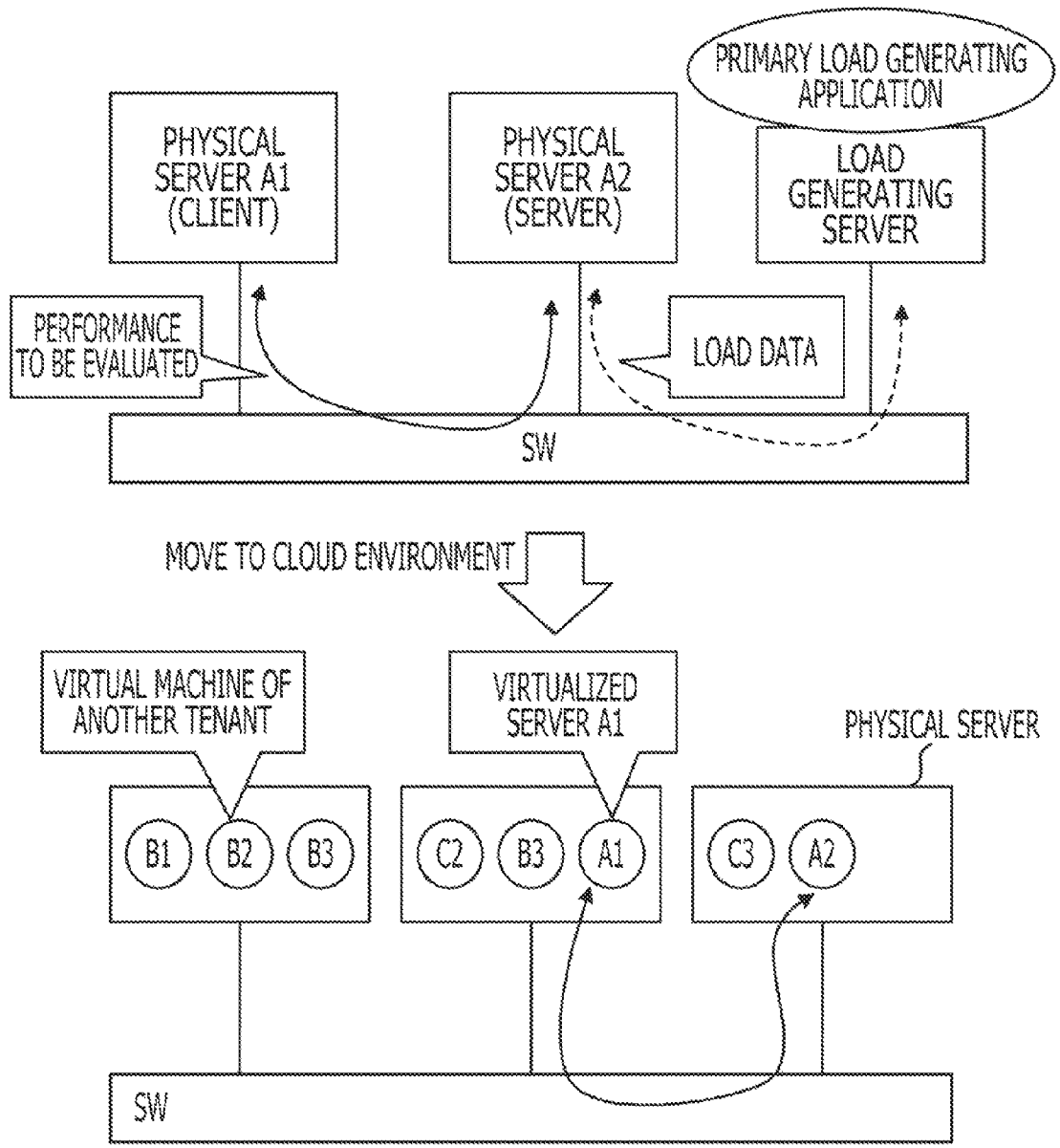
FIG. 1 is a diagram for explaining a conventional technique.

Therefore, in the conventional technique shown in FIG. 1, even when the performance evaluation and the performance tuning are conducted in a local environment, the secondary loads in the cloud environment are not considered. Therefore, there is a problem that, even when the ICT system is moved to a cloud environment, it may be impossible to obtain the same performance as that obtained in the performance evaluation and the performance tuning conducted in the local environment, so that the performance evaluation and the performance tuning of the system need to be conducted again after the system is moved to the cloud environment.

Figure 2:
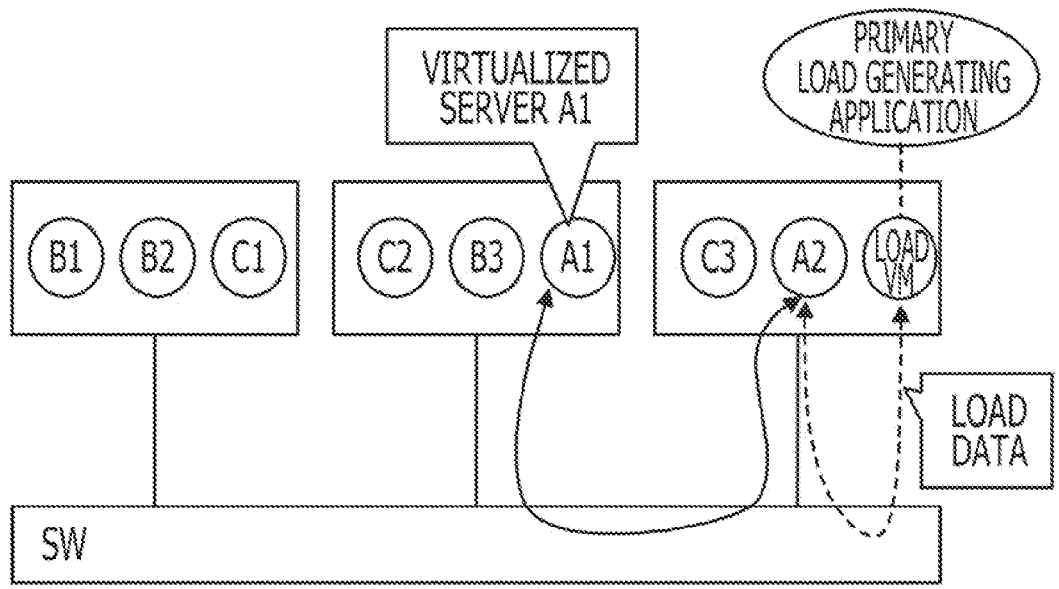
FIG. 2 is a diagram for explaining another conventional technique.

On the other hand, in the conventional technique shown in FIG. 2, the performance evaluation can be conducted in an environment in which loads from other virtual ICT systems are applied to the system. However, there is a problem that excessive computer loads and communication loads generated from the operations of the performance evaluation and performance tuning of the virtual ICT system to be tested may adversely affect other systems actually used on the cloud. In addition, there is also a problem that, although secondary loads are applied in the environment, appropriate performance tuning cannot be conducted depending on the loads of other systems when conducting performance tuning of the ICT system to be tested.

Operation Principle of a Communication Test System According to an Embodiment

Figure 3:
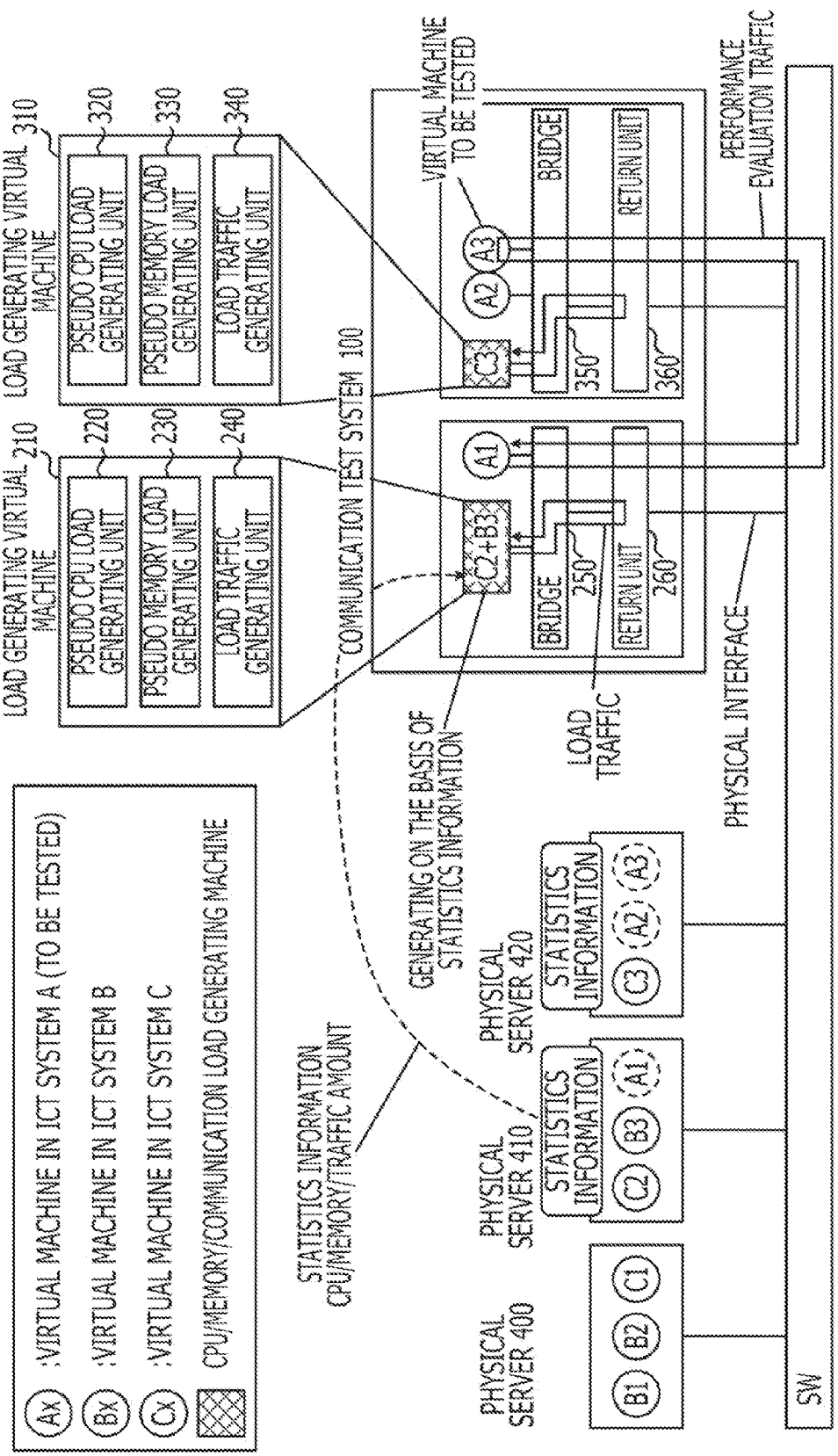
FIG. 3 is a functional block diagram of a communication test system according to an embodiment.

An operation principle of a communication test system 100 according to an embodiment will be described with reference to FIG. 3. FIG. 3 is a functional block diagram of the communication test system 100.

The communication test system 100 is a system for evaluating and tuning (adjusting) a virtual ICT (Information and Communication Technology) system to be tested. The communication test system 100 includes a test server 200 and a test server 300. The test server 200 includes a virtual machine A1 to be tested that configures the virtual ICT system to be tested and a load generating virtual machine 210 including a unit for generating secondary loads (CPU (Central Processing Unit), memory use, traffic) due to the other virtual machines B3 and C2 that share physical server resources with the virtual machine A1 in a cloud environment. Further, the test server 200 includes a virtual bridge 250 that connects the virtual machine A1 to be tested to a load generating virtual machine 210, and a return unit 260 for returning load traffic generated by the load generating virtual machine 210. Further, the test server 200 includes a VM control mechanism (supervisor) for controlling the virtual machine A1 to be tested and the load generating virtual machine 210 as a virtual machine.

In the same manner, the test server 300 includes virtual machines A2 and A3 to be tested that configure the virtual ICT system to be tested, a load generating virtual machine 310 including a unit for generating secondary loads (CPU (Central Processing Unit), memory use, traffic) due to the other virtual machine C3 that shares physical server resources with the virtual machines A2 and A3 in a cloud environment, a virtual bridge 350 that connects the virtual machine A2 and A3 to the load generating virtual machine 310, and a return unit 360 for returning load traffic generated by the load generating virtual machine 310.

The number of required test servers is the number of physical servers in which a virtual machine included in the virtual ICT system to be tested is disposed. For example, if there are three virtual machines that configure the ICT system and the virtual machines are disposed in two physical machines, two test servers are used and/or in the communication test system 100.

Here, an operation of the communication test system 100 will be described using the test server 200 as an example. The test server 200 includes the virtual machine A1 to be tested and the load generating virtual machine 210, and these virtual machines are connected to each other through a virtual bridge and connected to a physical interface included in the test server 200.

The load generating virtual machine 210 generates a specified and/or predetermined load so that an operation environment of the virtual machine A1 to be tested is the same as that of a physical server 410 in the cloud environment. Specifically, the load generating virtual machine 210 generates CPU, memory, and communication loads on the basis of statistics information (for example, statistics information related to CPU load, amount of memory usage, amount of communication, and the like) of the other virtual machines C2 and B3 that share resources with the virtual machine A1 on the cloud environment.

By doing this, the virtual machine A1 on the test server 200 can operate in the same environment of secondary loads (CPU load, amount of memory usage) as that of the physical server 410. In addition, an environment in which the same secondary communication load as that of the physical server 410 is applied is reproduced at a portion of an external output port (a port connected to a physical interface) of the bridge 250. In the test server 200 in the communication test system 100, a performance evaluation and tuning can be conducted in the same environment as the actual cloud environment.

The return unit 260 has a function of returning a load packet generated by the load generating virtual machine 210, so that the load packet generated by the load generating virtual machine 210 is not outputted to the outside of the test server 200. Therefore, the communication system 100 does not adversely affect the other virtual ICT systems in the cloud environment.

Two or more load generating virtual machines 210 may be created in the test server 200. In this embodiment, the load generating virtual machines 210 may be created respectively for the virtual machines C2 and B3.

First Embodiment of the Communication Test System 100

Figure 4:
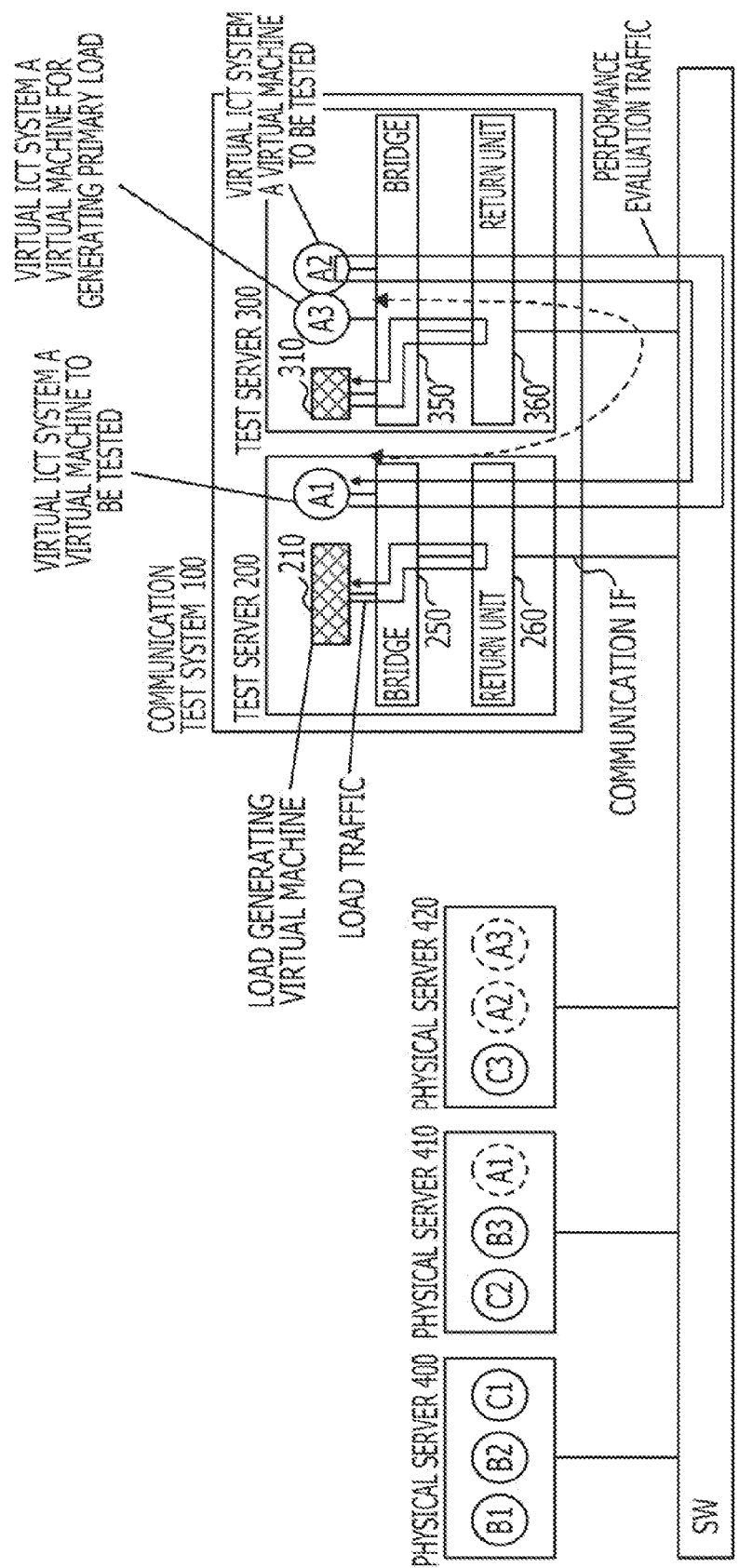
FIG. 4 is a system configuration diagram including a communication test system according to a first embodiment.
Figure 5:
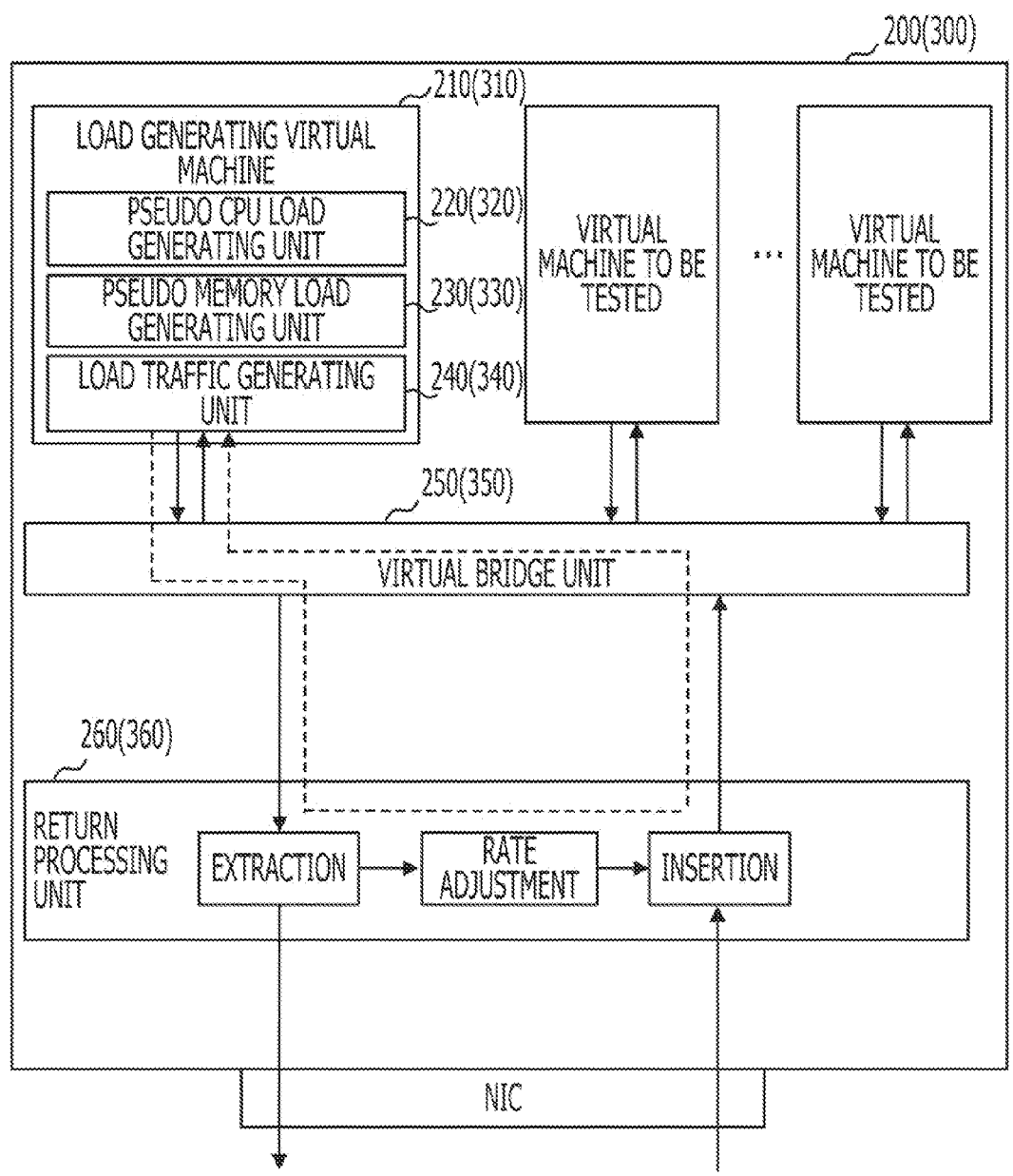
FIG. 5 is a configuration diagram of a test server according to the first embodiment.

A first embodiment of the communication test system 100 will be described with reference to FIGS. 4 to 8. FIG. 4 is a configuration diagram including the communication test system 100 according to the first embodiment, and FIG. 5 is a configuration diagram of the test servers 200 and 300. As shown in FIG. 4, there are three physical servers 400, 410, and 420 in the actual cloud environment, and a plurality of virtualized virtual servers (hereinafter referred to as virtual machine(s)) are running on each physical server.

It is assumed that, a virtual ICT system B and a virtual ICT system C are already running in the actual cloud environment, and a virtual ICT system A is newly added in the environment. A virtual machine A1 that configures the virtual ICT system A is disposed in the physical server 410 after a performance evaluation, and virtual machines A2 and A3 that configure the virtual ICT system A are disposed in the physical server 420. Hereinafter, a processing example for conducting a performance evaluation and tuning of the virtual ICT system A in a virtual environment will be described.

Figure 6:
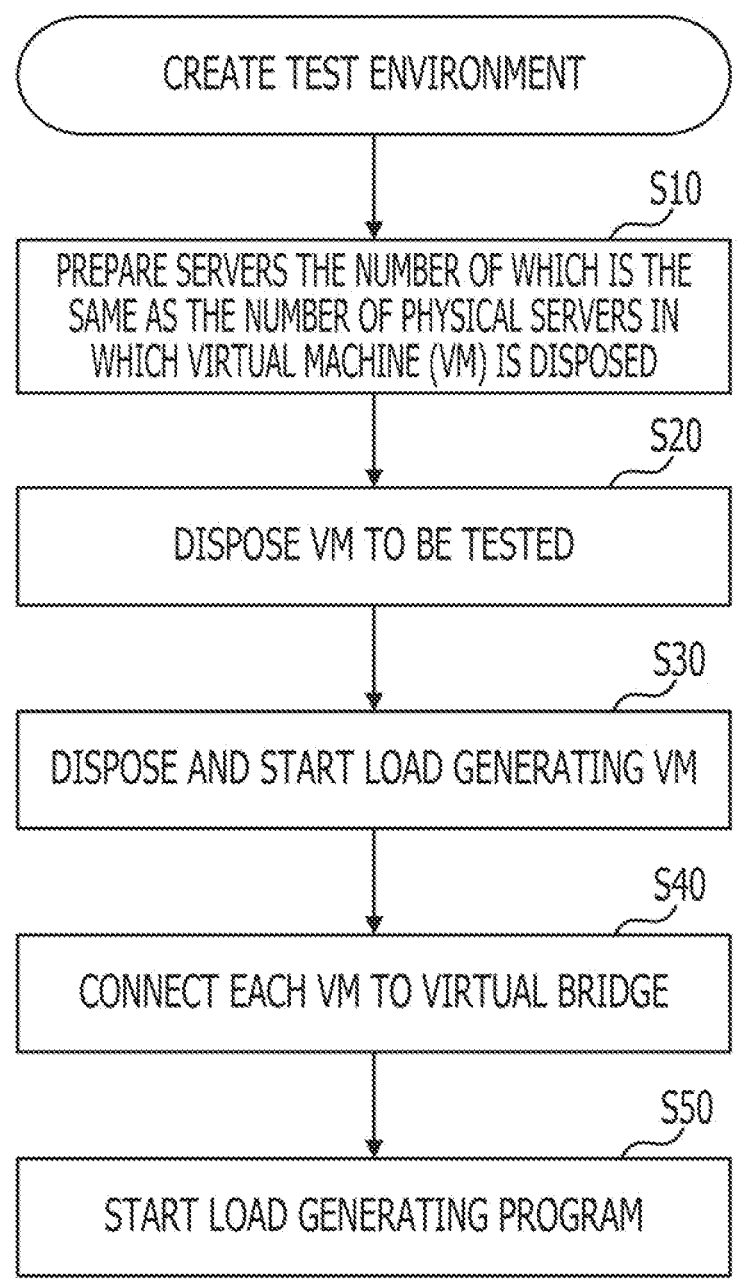
FIG. 6 is a flowchart for creating a test environment according to the first embodiment.

FIG. 6 shows a flowchart for creating a test environment. In S10, the test servers 200 and 300, the number of which is the same as the number of the physical servers in which the virtual machines A1, A2, and A3 that are included in the virtual ICT system A in the cloud environment are disposed, are prepared. In S20, the virtual machine A1 to be tested is disposed in the test server 200 and the virtual machines A2 and A3 to be tested are disposed in the test server 300.

In S30, to generate loads (secondary loads) which are assumed to be generated in the actual cloud environment in the test servers 200 and 300, the load generating virtual machine 210 is disposed in the test server 200 and the load generating virtual machine 310 is disposed in the test server 300.

In S40, the virtual machine A1 and the load generating virtual machine 210 on the test server 200 are connected to each other through the virtual bridge 250, and the virtual machines A2 and A3 and the load generating virtual machine 310 on the test server 300 are connected to each other through the virtual bridge 350. The virtual machine A1 and the load generating virtual machine 210 on the test server 200 are connected to a network interface of the test server 200 through the virtual bridge 250. The virtual machines A2 and A3 and the load generating virtual machine 310 on the test server 300 are connected to a network interface of the test server 300 through the virtual bridge 350.

In S50, a pseudo CPU load generating unit 220, a pseudo memory load generating unit 230, and a load traffic generating unit 240 on the load generating virtual machine 210 are started. On the other hand, a pseudo CPU load generating unit 320, a pseudo memory load generating unit 330, and a load traffic generating unit 340 on the load generating virtual machine 310 are started. The pseudo CPU load generating unit 220 and 320, the pseudo memory load generating unit 230 and 330, and the load traffic generating unit 240 and 340 generate a specified and/or predetermined load in accordance with a specified load model.

Here, the pseudo CPU load generating unit 220 and 320 can generate a CPU load by executing a program (job) that repeats a specific calculation. The pseudo memory load generating unit 230 and 330 can generate a load for securing a storage area in a memory by executing a program that secures a specified amount of memory using a malloc( ) function or the like. The load traffic generating unit 240 and 340 can generate a communication load by executing a program that generates a specified and/or predetermined amount of load packets.

In the load packets generated by the load traffic generating unit 240 and 340, the MAC (Media Access Control) address of the transmission destination (destination address) is a unique MAC address in the test server 200 and 300 respectively. This is because the return processing unit 260 and 360 are to be able to identify the load packets. In the load packets generated by the load traffic generating unit 240 and 340, the MAC address of the transmission source is the MAC address of the load generating virtual machines 210 and 310 respectively.

Figure 7:
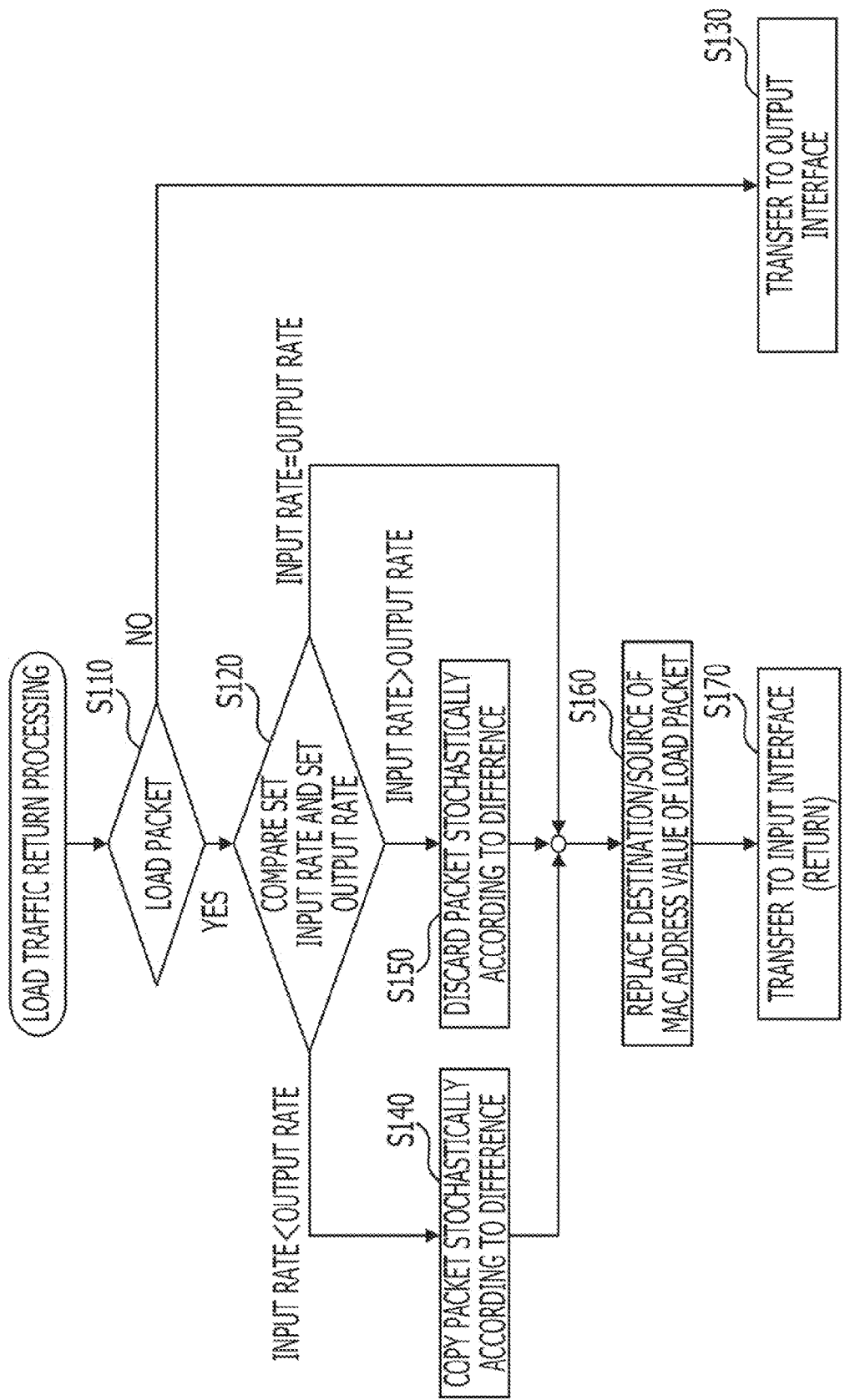
FIG. 7 is a flowchart of load traffic return processing according to the first embodiment.

Here, processing when the load packet transmitted from the load generating virtual machines 210, 310 reaches the return unit 260, 360 through the virtual bridges 250, 350 will be described with reference to FIG. 7. FIG. 7 is a flowchart of load packet return processing. Although hereinafter, the processing will be described using the return unit 260 as an example, the same processing flow can be applied to the return unit 360.

When a packet arrives at the return unit 260, in S110, the return unit 260 determines whether or not the packet is the load packet by referring to the destination MAC address of the received packet. In S110, if the destination MAC address of the received packet includes the MAC address which is added to the load packet (Yes in S110), the return unit 260 extracts the received packet. Then, in S120, the return unit 260 compares an "input rate" and an "output rate" which are set to the load packet.

In S120, if the "input rate"<the "output rate", in S140, the return unit 260 replicates the load packet to the level of the set "output rate". In S120, if the "input rate">the "output rate", in S150, the return unit 260 discards the load packet to the level of the set "output rate". Then, in S160, the return unit 260 changes the destination MAC address of the received load packet to the transmission source MAC address of the received load packet, and changes the transmission source address to a load packet identification MAC address. Further, in S170, the return unit 260 transfers the load packet processed in S160 to an input interface.

In this way, the load traffic generated by the load generating virtual machine 210 is not outputted to the outside of the test server 200, so that the communication system 100 does not adversely affect the other virtual ICT systems in the cloud environment. By adjusting the output rate in the return unit 260 as described above, it is possible to reproduce a test environment in which the communication rate is different between uplink and downlink. When a plurality of load generating virtual machines 210 are created in the test server 200, the load packet may be returned by a load generating virtual machine 210 different from the transmission source load generating virtual machine 210. Specifically, in S160, the return unit 260 changes the destination MAC address of the received load packet to the MAC address of a load generating virtual machine 210 different from the transmission source load generating virtual machine 210. The MAC address of a load generating virtual machine 210 different from the transmission source load generating virtual machine 210 may be set in the return unit 260 in advance.

On the other hand, in S110, if the destination MAC address of the received packet does not include the MAC address which is added to the load packet (No in S110), the received packet is outputted to the output interface.

Figure 8:
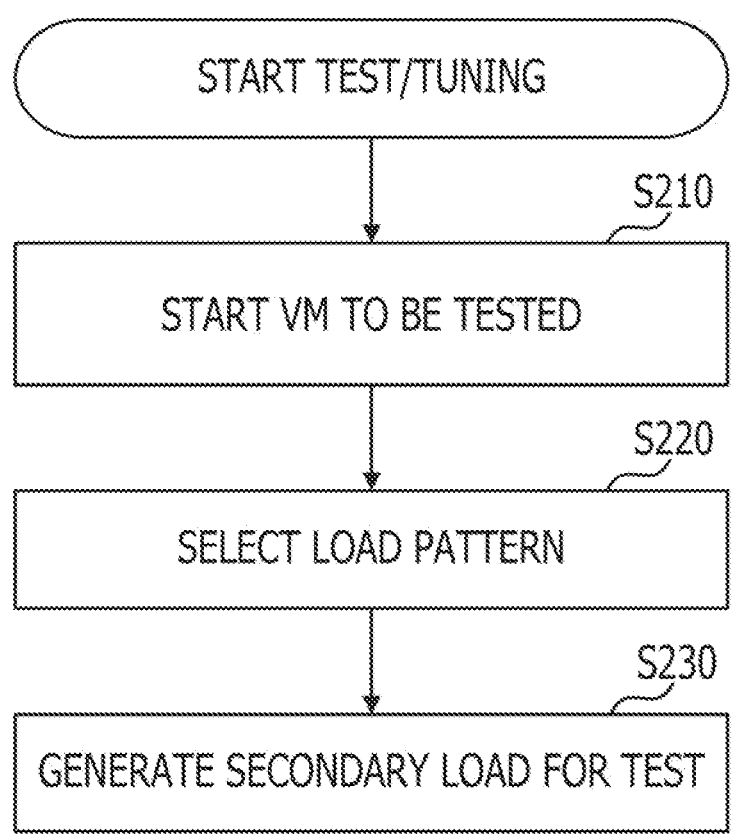
FIG. 8 is a flowchart of a communication test performed in an environment according to the first embodiment.

On the other hand, the communication test in the communication test system 100 is performed in accordance with a flowchart shown in FIG. 8. In S210, the virtual machines A1, A2, and A3 to be tested are started, and in S220, load patterns to be generated in the load generating virtual machines 210 and 310 are selected. Then, in S230, the load generating virtual machines 210 and 310 generate loads according to the selected load patterns, and the communication test is performed between the virtual machines A1, A2, and A3 to be tested.

By the processing described above, the virtual machines A1, A2, and A3 to be tested operate in a state in which the secondary loads (CPU load, memory load, and communication load) are applied in the cloud environment. By conducting performance evaluation of the virtual machines A1, A2, and A3, it is possible to conduct performance evaluation of the virtual ICT system in the same environment as the cloud environment.

It is possible to create a test environment in which system tuning work can be reduced and influence to other systems is decreased.

For example, it is assumed that the virtual machine A2 plays a role of a server function of the ICT system, the virtual machine A1 plays a role of a client function, and the virtual machine A3 plays a role of a primary load generating function to the virtual machine A2. In this case, the performance test of the ICT system A can be conducted in an environment in which the secondary loads generated by the load generating virtual machines 210 and 310 are applied in addition to the primary loads.

The return unit 260 and 360 return the load packets generated by the load generating virtual machines 210 and 310 inside the test server, so that the load packets are not transmitted to the outside of the test servers 200 and 300. Therefore, the communication system 100 does not adversely affect the other virtual ICT systems (B and C) that are being used in the cloud environment.

Second Embodiment of the Communication Test System 100

Figure 9:
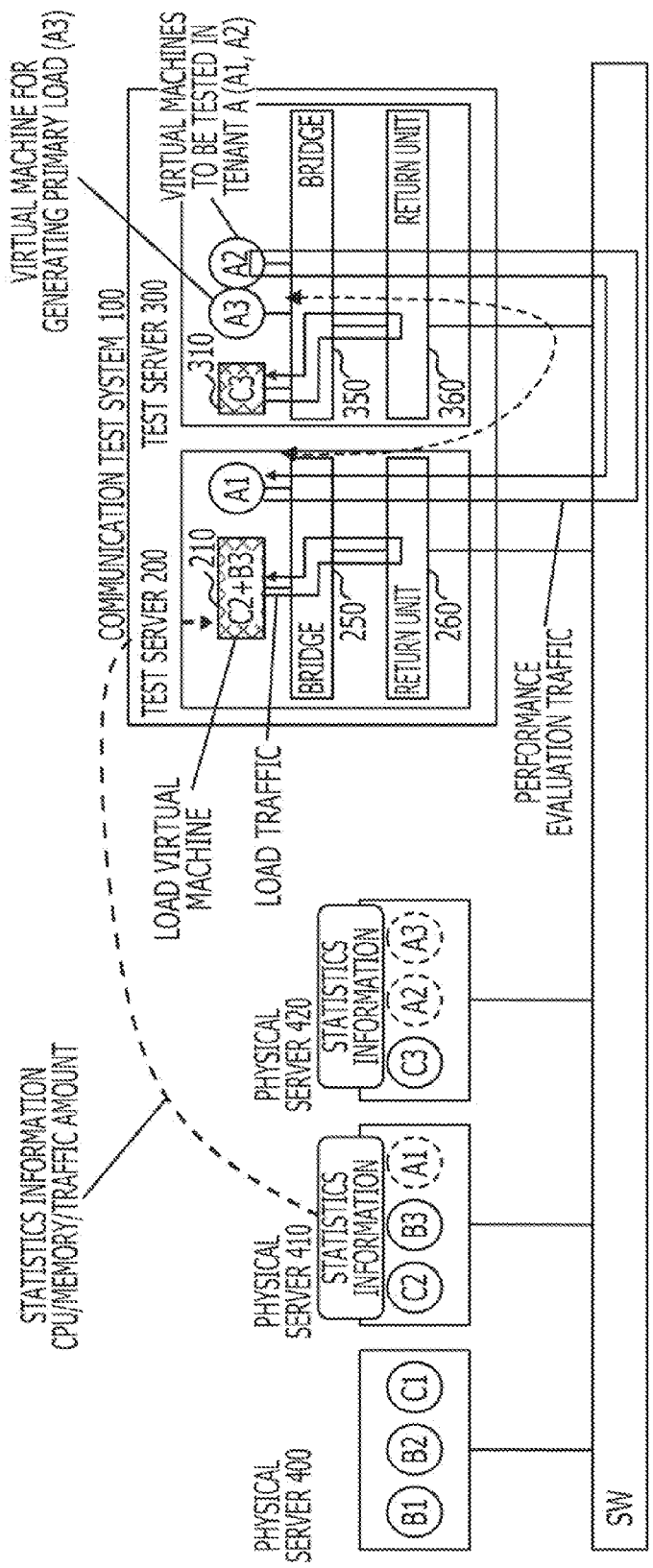
FIG. 9 is a system configuration diagram including a communication test system according to a second embodiment.
Figure 10:
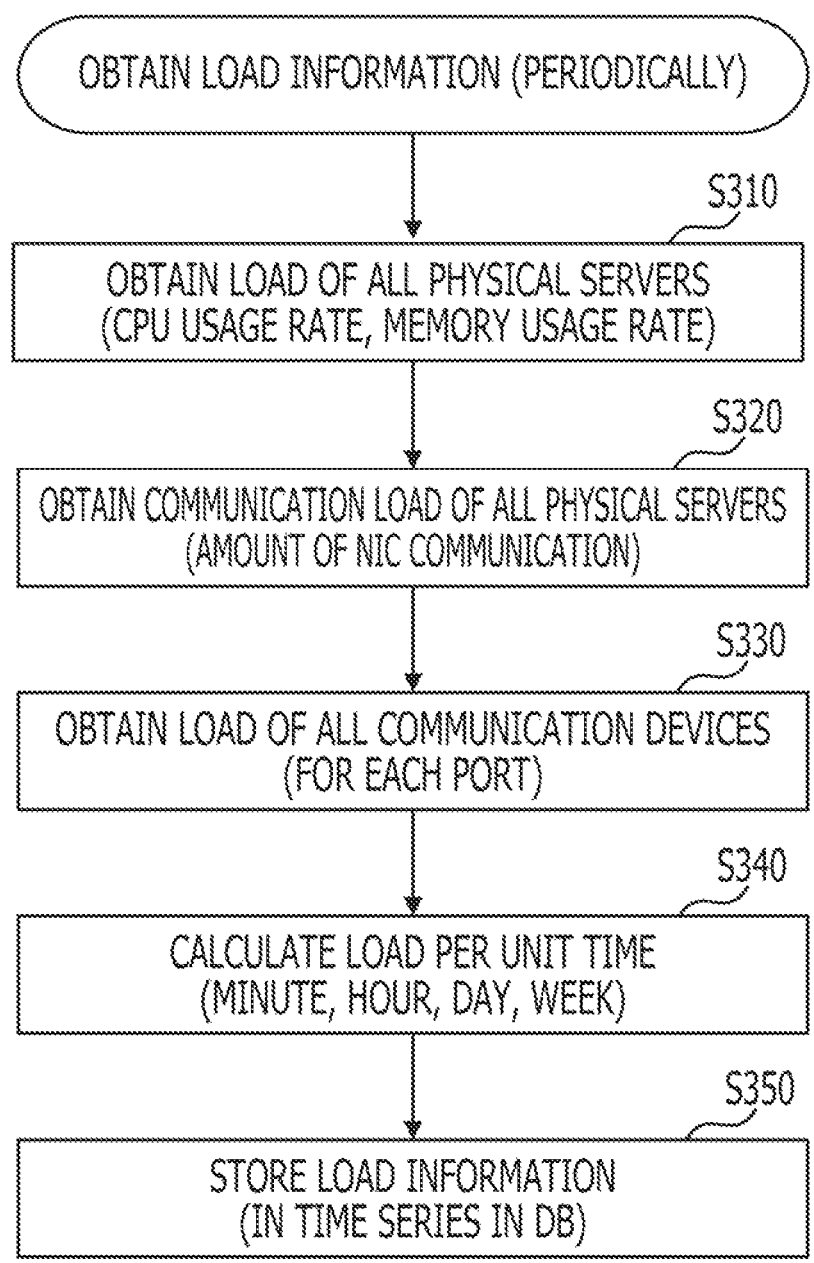
FIG. 10 is a flowchart for creating a load information database according to the second embodiment.

A second embodiment of the communication test system 100 will be described with reference to FIGS. 9 to 13. FIG. 9 is a configuration diagram including the communication test system 100 according to the second embodiment. As shown in FIG. 9, also in the second embodiment, there are three physical servers 400, 410, and 420 in the cloud environment, and a plurality of virtualized virtual machines run on each physical server.

The load generating virtual machines 210 and 310 in the first embodiment generate loads according to a specific load model. On the other hand, the load generating virtual machines 210 and 310 in the second embodiment reproduce actual loads (loads obtained when the physical servers 410 and 420 operate in a system being used) of the physical servers 410 and 420 in which the virtual machines A1, A2, and A3 to be tested are disposed.

In the second embodiment, a CPU usage rate, a memory usage rate, and an amount of communication of communication port of all the physical servers 400, 410, and 420 in the cloud environment are periodically obtained. Then, average loads per unit time (for example, one minute, ten minutes, or one hour) are calculated on the basis of the obtained data, and the calculated average loads are arranged in time series to be stored in a load database. Specifically, in S310, the communication test system 100 periodically obtains a CPU usage rate and a memory usage rate of all the physical servers 400, 410, and 420. In S320 and S330, the communication test system 100 periodically obtains an amount of communication for each communication port of all the physical servers 400, 410, and 420.

In S340, the communication test system 100 calculates loads per unit time on the basis of the data obtained in S310 to S330. Then, in S350, the communication test system 100 arranges the calculated load information in time series and stores the arranged load information in the load database. FIG. 13 shows an example of the load database.

Figure 11:
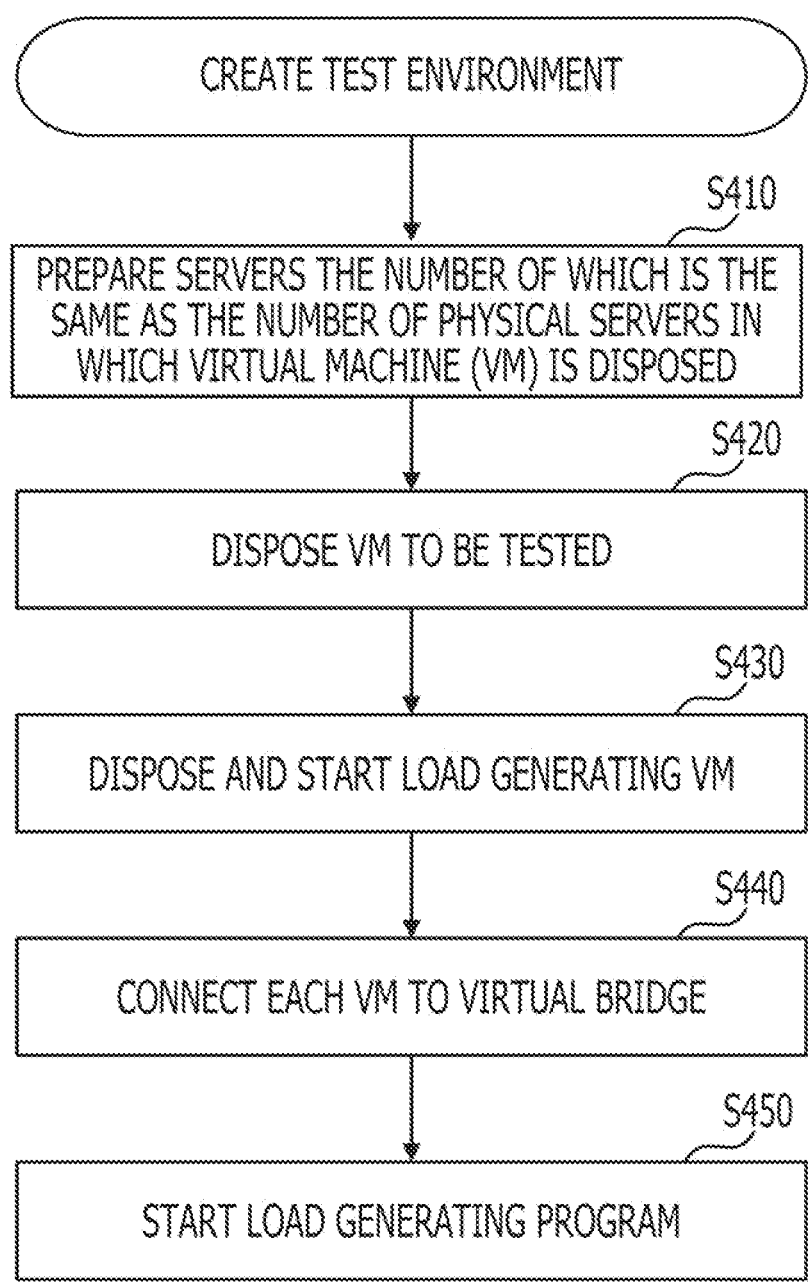
FIG. 11 is a flowchart for creating a test environment according to the second embodiment.

On the other hand, the communication test system 100 creates a test environment in accordance with a processing flow of S410 to S450 shown in FIG. 11. The processing flow shown in FIG. 11 is the same as the processing flow for creating a test environment in the first embodiment.

Figure 12:
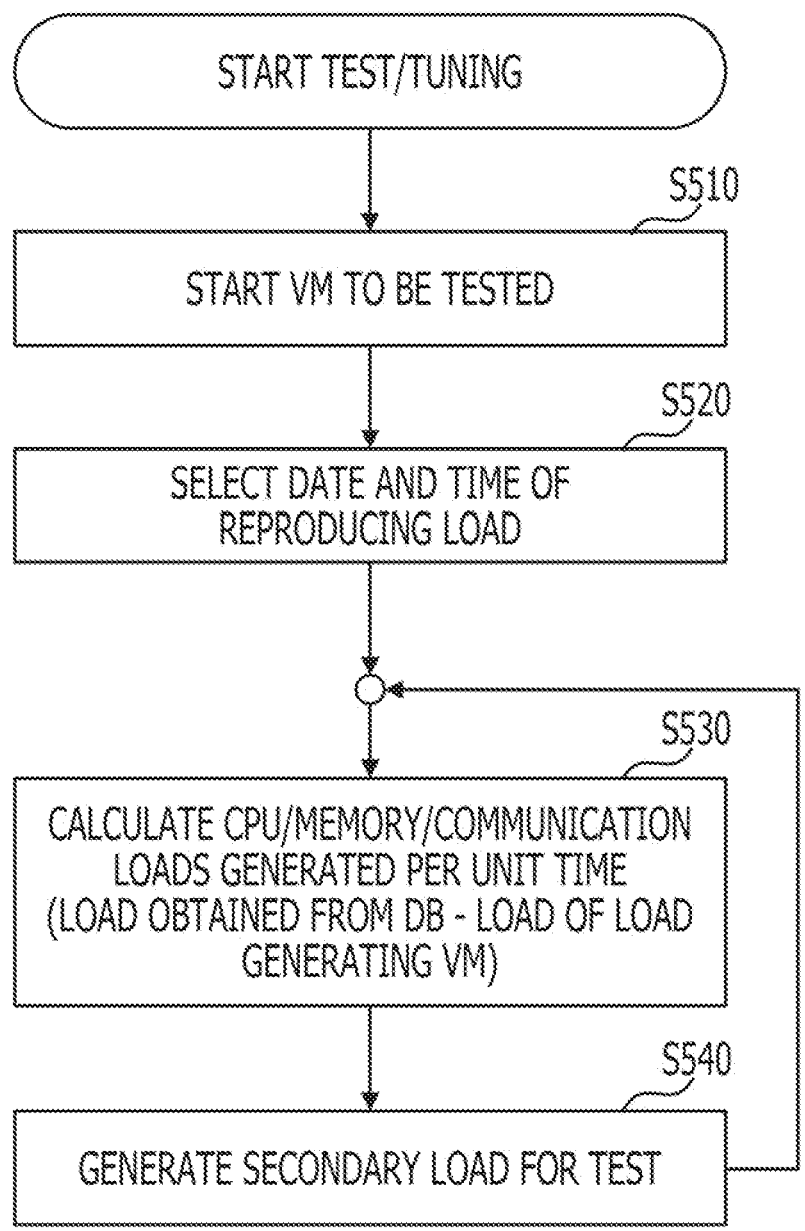
FIG. 12 is a flowchart of a communication test performed in an environment according to the second embodiment.

After the load generating program is started in S450, the communication test in the communication test system 100 is performed in accordance with a flowchart shown in FIG. 12. In S510, the virtual machines A1, A2, and A3 to be tested are started, and in S520, load patterns to be generated in the load generating virtual machines 210 and 310 are selected. Here, the selection of the load patterns is performed by selecting a date and time when the load to be reproduced was generated.

In S530, the load generating virtual machines 210 and 310 extract load information of the selected date and time from the load database, and generate the same load as the extracted load information (reproduce the load of the selected date and time). For example, the load generating virtual machine 210 obtains load information of the virtual machines C2 and B3 of the physical server 410, and reproduces loads corresponding to the load information on the test server 200. The same processing is performed on the test server 300, and the communication test is performed between the virtual machines A1, A2, and A3 to be tested in the test environment.

By performing the processing described above, the communication test system 100 can conduct accurate performance evaluation and tuning of the virtual machines based on the load information of the cloud environment where the physical servers are actually disposed.

When the load generating unit (load generating virtual machines) 210 and 310 generate a load, due to a load of the load generating program itself, a load higher than a load of the actual environment that is desired to be reproduced is applied on the virtual machines A1, A2, and A3 to be tested. To avoid this, it is possible to employ a configuration in which the load generating unit 210 and 310 subtract the load of the load generating unit 210 and 310 themselves from the load information obtained from the load database, and generate a load having an amplitude obtained by the above subtraction. Here, the load of the load generating unit 210 and 310 themselves is a load applied to CPUs included respectively in the test servers 200 and 300 when the load generating unit 210 and 310 are operated.

Hereinafter, an example in which the load of the load generating unit 210 and 310 themselves is considered will be described with reference to FIG. 13. As shown in FIG. 13, for example, a load generated at time $\tau 2$ is 9% which is obtained by subtracting 3% that is a load of a load generating program necessary to generate the CPU load from 12% that is a value obtained from the load database. The load generating unit 210 and 310 calculates the number of calculation loops to generate CPU processing necessary to generate a load of 9%, and executes the calculated number of calculation loops as a load generated at time $\tau 2$. By repeating this processing every time $\tau 2$, it is possible to reproduce accurate test environment considering a load generated by the load generating program.

While the CPU load is explained in the description using FIG. 13, also in a case of the amount of memory usage, in the same manner, it is possible to reproduce accurate test environment considering a load generated by the load generating program.

By the processing described above, the communication test system 100 makes it possible to conduct performance evaluation and tuning of the system in a test environment in which an environment of an arbitrary period of time is reproduced by specifying the date and time of environment desired to be reproduced.

Third Embodiment of the Communication Test System 100

Figure 14:
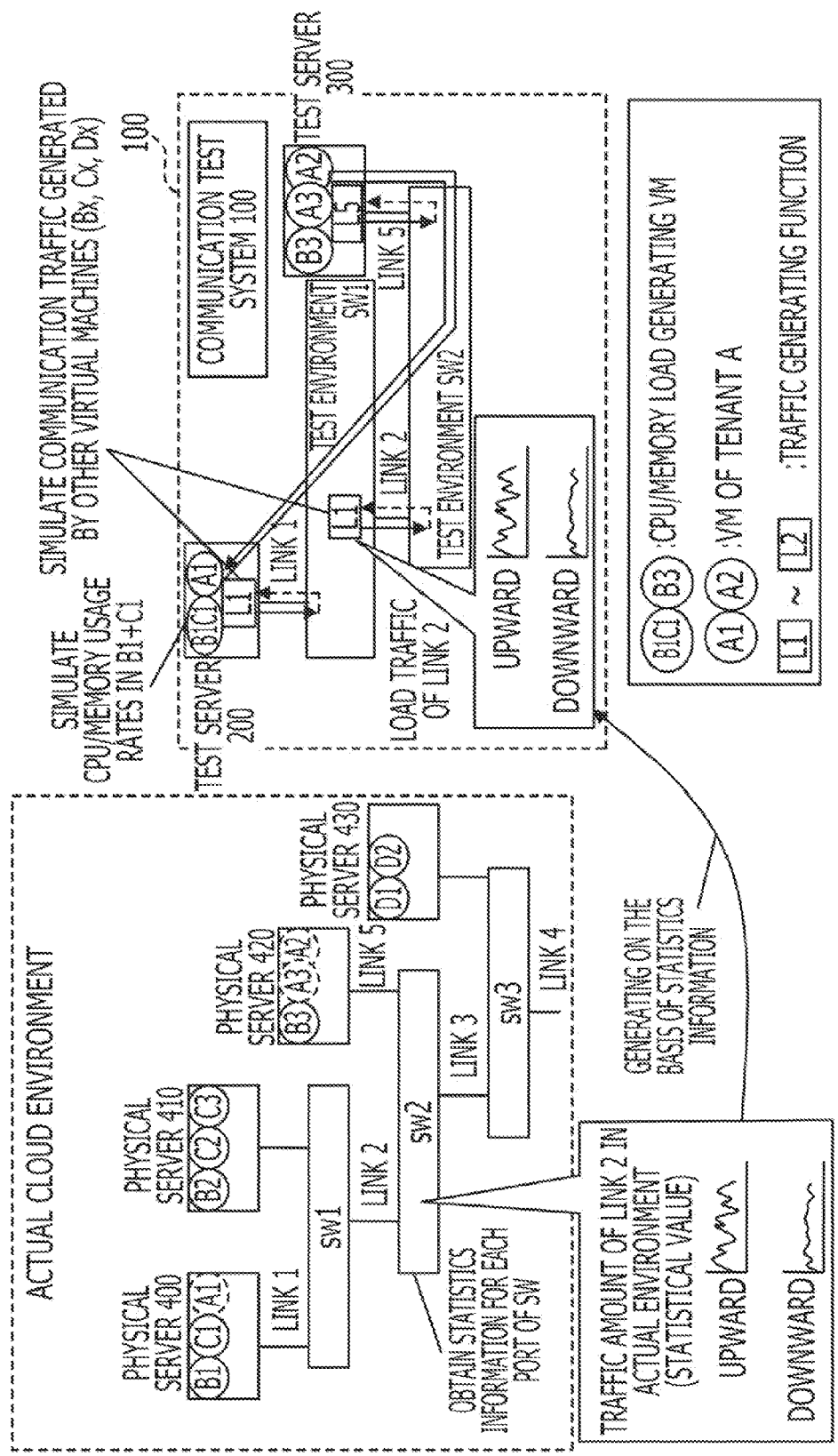
FIG. 14 is a system configuration diagram including a communication test system according to a third embodiment.
Figure 15:
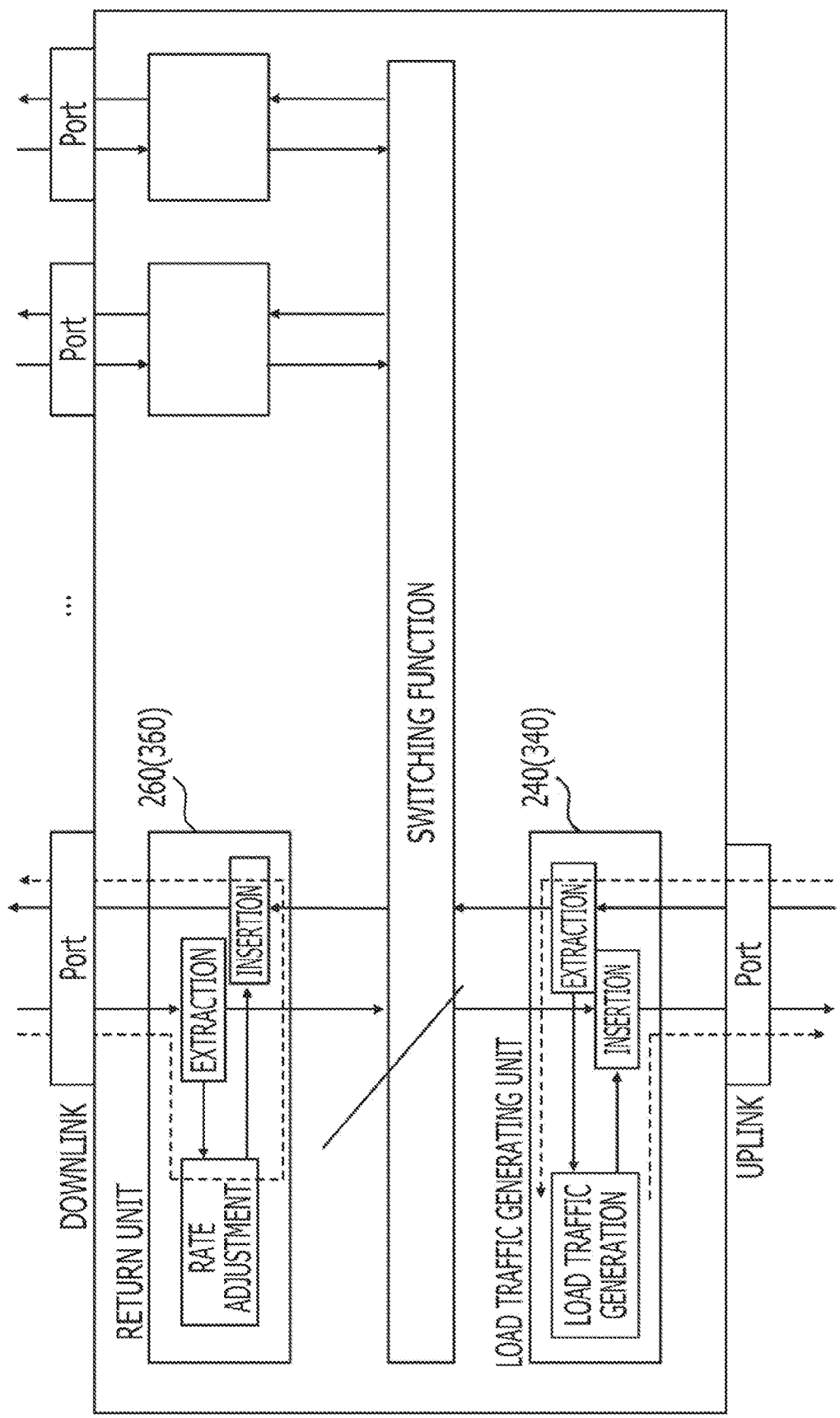
FIG. 15 is a configuration diagram of a switch in a test environment according to the third embodiment.

A third embodiment of the communication test system 100 will be described with reference to FIGS. 14 and 15. FIG. 14 is a configuration diagram including the communication test system 100 according to the third embodiment, and FIG. 15 is a diagram showing a test environment switch.

When the virtual machines A1, A2, and A3 that are included in the virtual ICT system are contained in the physical servers 400 and 420 which are connected to each other via physical network devices SW1 and SW2 different from each other, the communication between a plurality of physical servers needs to pass through a plurality of network devices. As a result, the communication between the virtual machines A1, A2, and A3 shares the link bandwidth of the physical network devices SW1 and SW2 with other ICT systems.

For example, the link 2 in FIG. 14 is a link used for the communication between the virtual machines in the virtual ICT system A, and also the link 2 is used for the communication between virtual machines in the virtual ICT systems B and C. Therefore, when creating a test environment, the shared state of the link between the physical network devices should be reproduced. Hereinafter, a creation method of such a test environment will be described.

In the same manner as in the first embodiment and the second embodiment, when creating a test environment, first, two test servers, the number of which is the same as the number of the physical servers (here, two physical servers) in which the virtual machines that are included in the virtual ICT system A to be tested are contained, are prepared. Then, as shown in FIG. 14, the virtual machines A1, A2, and A3 to be tested and the load generating virtual machines 210 and 310 are disposed in the two prepared test servers 200 and 300 respectively.

Next, two physical network devices, the number of which is the same as the number of the physical network devices (here, two physical network devices SW1 and SW2) disposed between the physical servers 400 and 420 in which the virtual machines of the ICT system A to be tested are contained, are prepared. Here, the physical network device is assumed to be an Ethernet switch.

The two prepared physical network devices (hereinafter referred to as switch(es)) include the return unit 260 and 360 described in the first embodiment on the down link (a port to the inside of the test server). The return unit 260 and 360 on the down link have a function to return a load packet in a port of their own.

The two switches include the load traffic generating unit 240 and 340 described in the first embodiment on the up link (a port to the external network). The load traffic generating unit 240 and 340 on the up link generate a load packet according to a specified amount of communication. The load packet is returned by the return unit of the next stage switch, so that the communication test system 100 can reproduce a link load between the switches.

Here, the setting of the load generated in the communication system 100 may be set using a general load model in the same manner as in the first embodiment. Or, in the same manner as in the second embodiment, the setting of the load may be set by accurately reproducing the traffic pattern of the actual environment on the basis of the traffic information between the switches in the actual environment.

By creating a test environment as described above, even when the virtual machines to be tested are contained in different physical network devices, it is possible to accurately conduct performance evaluation and tuning of the virtual ICT system.

Fourth Embodiment of the Communication Test System 100

Figure 16:
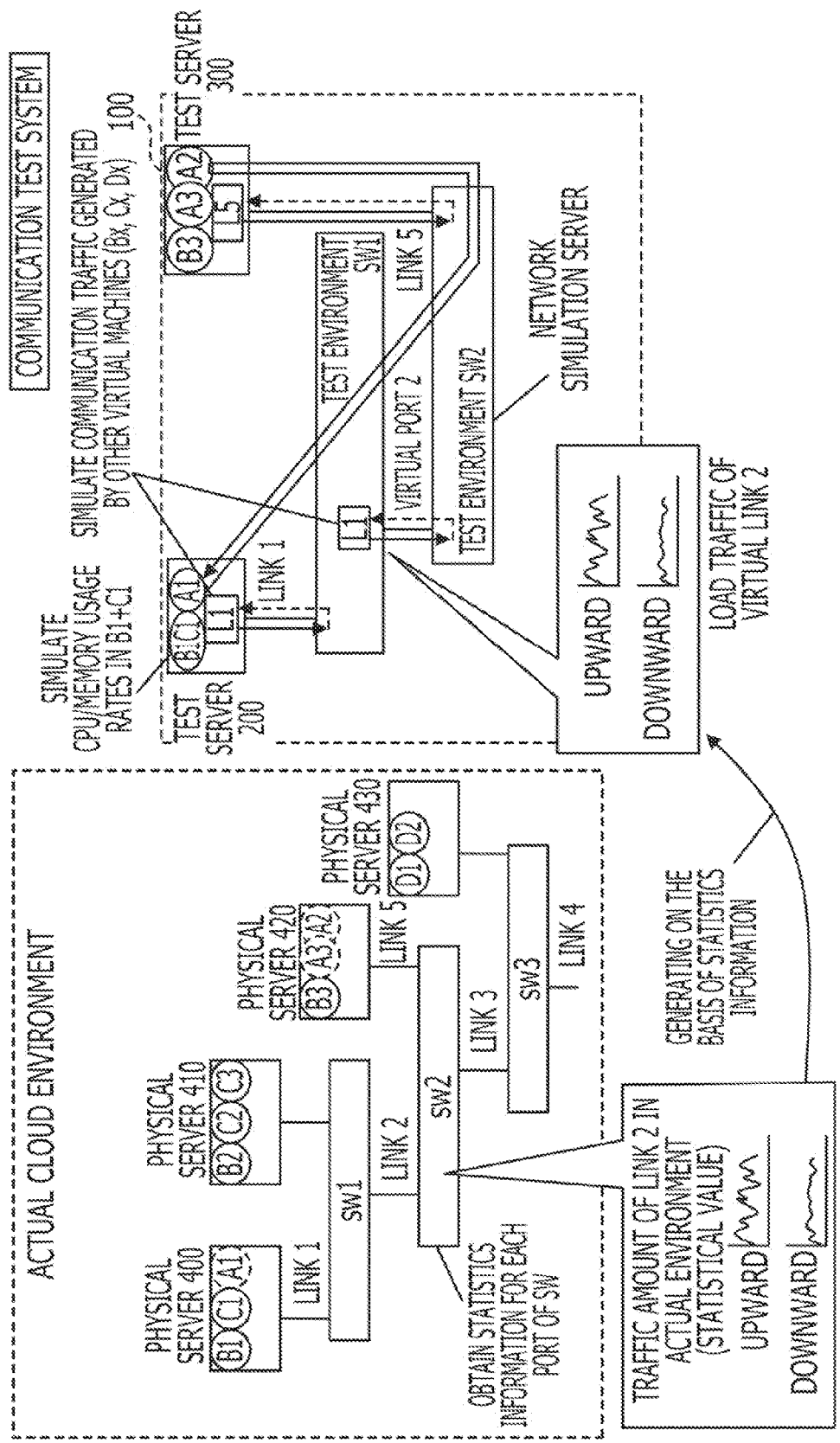
FIG. 16 is a system configuration diagram including a communication test system according to a fourth embodiment.

A fourth embodiment of the communication test system 100 will be described with reference to FIG. 16. FIG. 16 is a configuration diagram including the communication test system 100 according to the fourth embodiment. In the third embodiment, when reproducing the communication between a plurality of switches, a plurality of switches are required to create a test environment. On the other hand, in the fourth embodiment, a test environment is created with one server by using virtualization technology.

As shown in FIG. 16, switch functions in the test environment is realized by software switches, and virtual switches, the number of which is the same as the number of switches located between the virtual machines A1, A2, and A3 to be tested, are disposed. At input/output ports of each software switch, load packet generating processing and load packet return processing are performed in the same manner as in the third embodiment. In this way, in the fourth embodiment, a network configuration between the physical servers in the actual environment is reproduced.

As described above, the network test system 100 of the fourth embodiment can create the test environment with the test severs containing the virtual machines to be tested and one server in which the software switch is disposed, so that it is possible to eliminate operations to prepare many actual devices such as switches.

Fifth Embodiment of the Communication Test System 100

Figure 17:
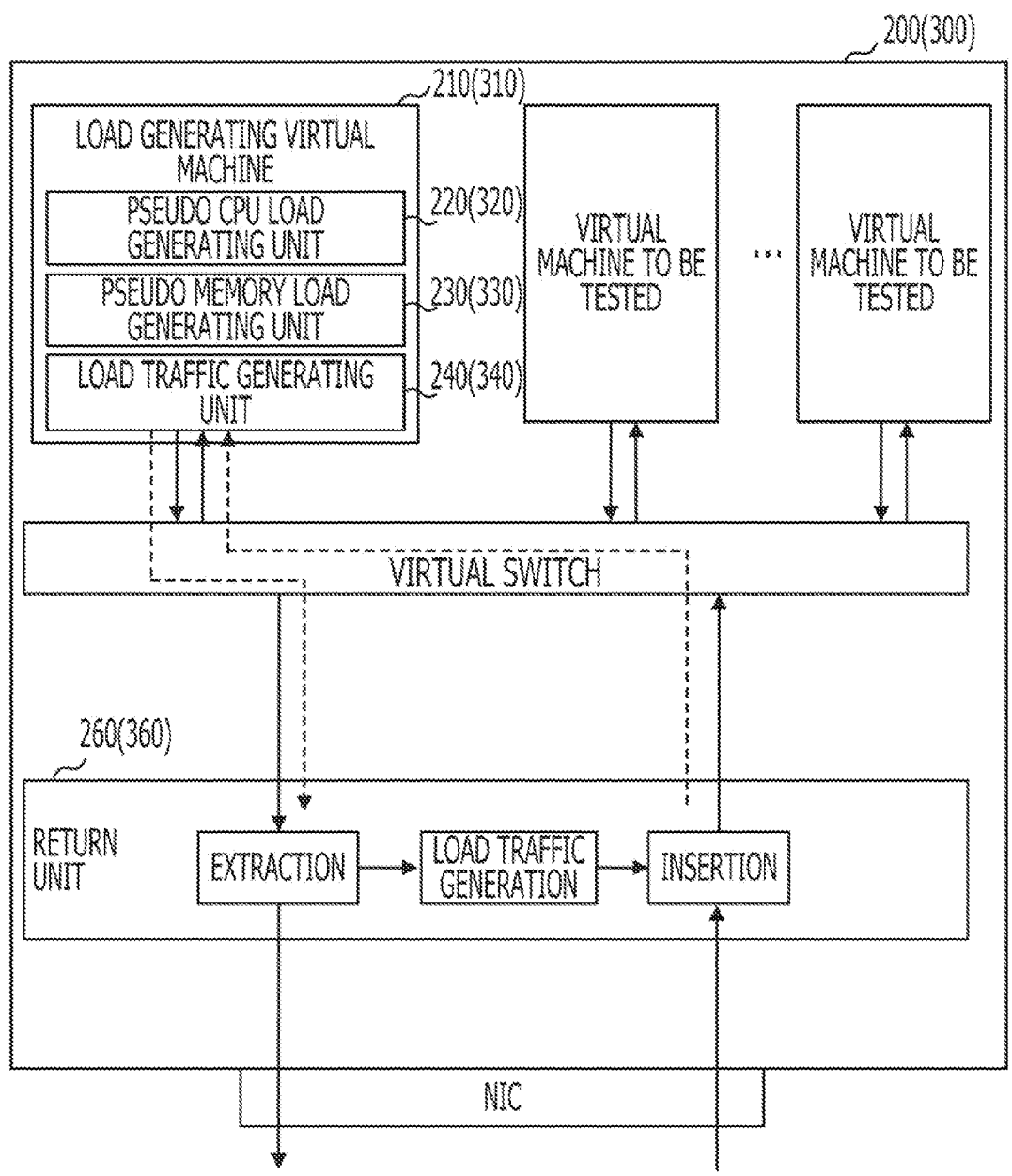
FIG. 17 is a configuration diagram of a test server according to a fifth embodiment.

A fifth embodiment of the communication test system 100 will be described with reference to FIGS. 17 to 18. FIG. 17 is a diagram showing a configuration of a test server (corresponding to FIG. 5) according to the fifth embodiment. On the other hand, FIG. 18 is a diagram showing a configuration of a switch (corresponding to FIG. 15) according to the fifth embodiment.

In the first embodiment to the fourth embodiment, a load packet generated by the load generating virtual machines 210 and 310 is returned by the return unit 260 and 360, and the traffic to the virtual machine is generated on the basis of the traffic to the external network.

Figure 18:
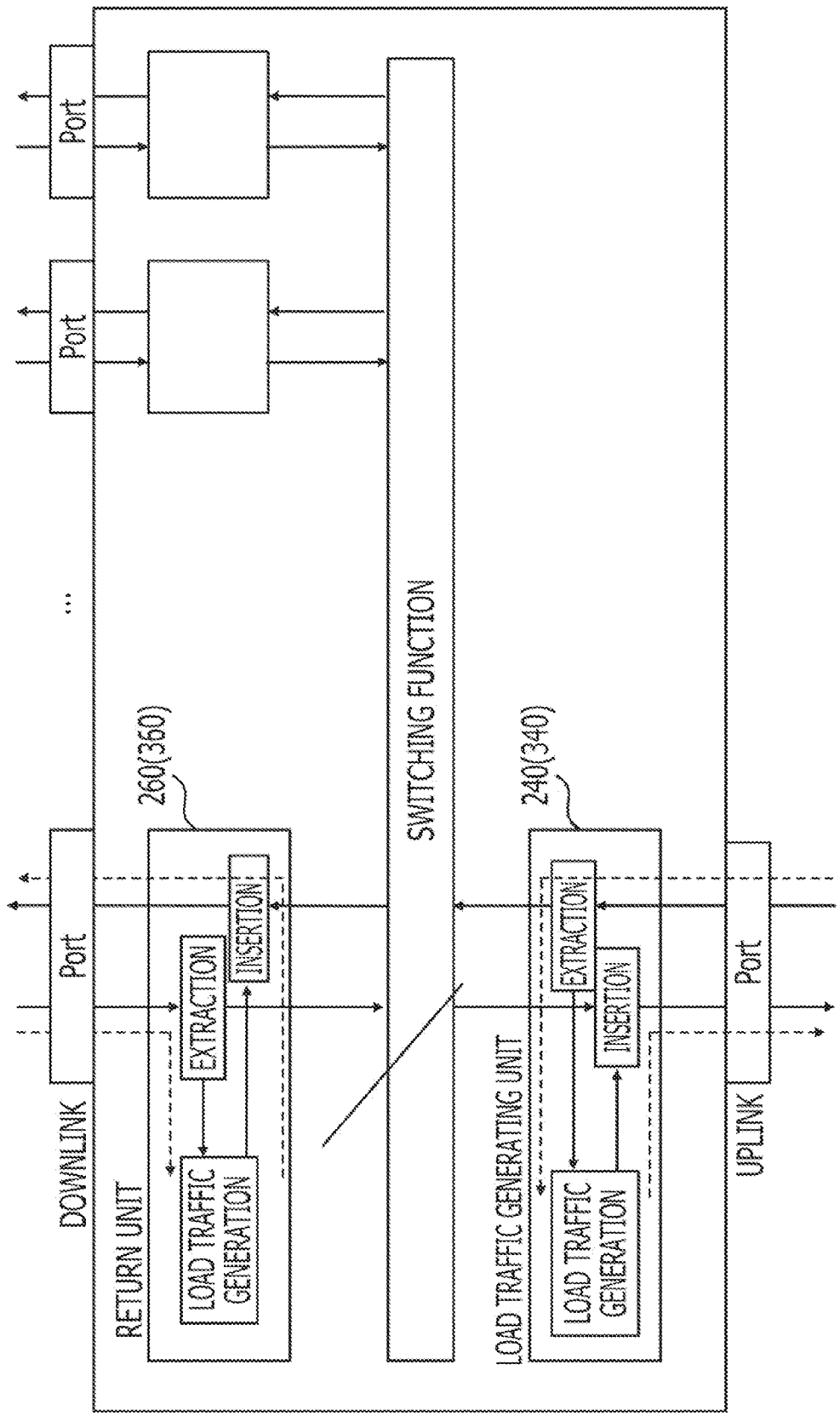
FIG. 18 is a configuration diagram of a switch in a test environment according to the fifth embodiment.

As shown in FIGS. 17 and 18, in the fifth embodiment, the return unit 260 and 360 extract an up link load packet and newly generate down link traffic on the basis of the extracted load packet.

Figure 19:
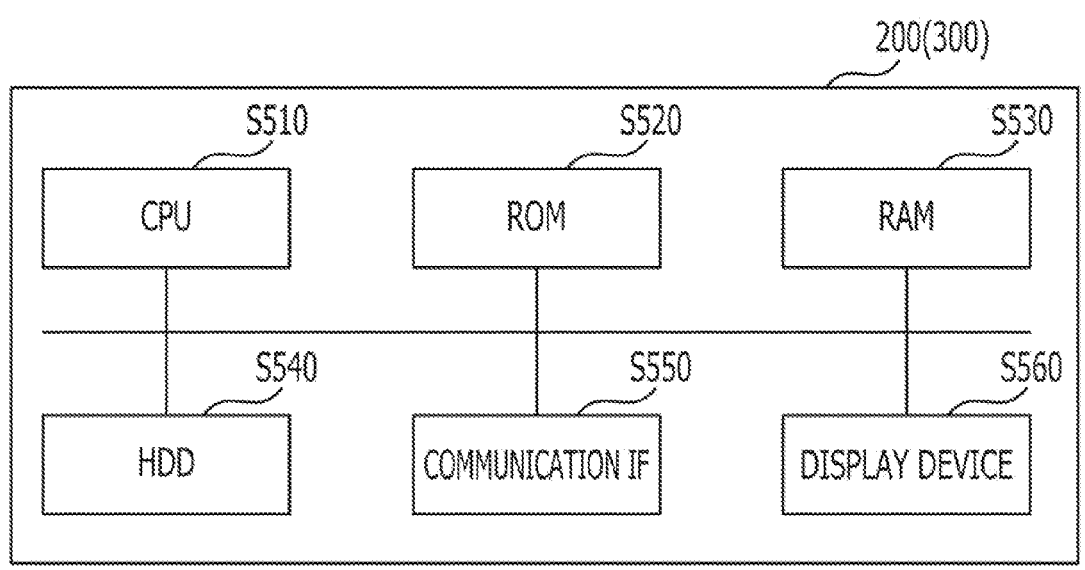
FIG. 19 is a diagram showing an example of a hardware configuration of a test server included in a communication test system according to an embodiment.

Hardware Configuration Example of the Test Server According to an Embodiment A hardware configuration example of the test servers 200 and 300 will be described with reference to FIG. 19. FIG. 19 is a diagram showing an example of a hardware configuration of the test servers 200 and 300. As described below, the test servers 200 and 300 may have the same hardware configuration, or may not have the same hardware configuration. The test servers 200 and 300 include a CPU (Central Processing Unit) 510, a ROM (Read-Only Memory) 520, a RAM (Random Access Memory) 530, an HDD (Hard Disc Drive) 540, a communication I/F 550, and a display device 560.

The CPU 510 is a device to execute a program stored in the ROM 520. The CPU 510 performs calculation processing on data developed (loaded) in the RAM 530 in accordance with instructions of the program and controls the test server 200 and 300. The ROM 520 stores data and programs executed by the CPU 510. The RAM 530 is a device in which the data and the program to be executed are developed (loaded) when the CPU 510 executes the program stored in the ROM 520. The RAM 530 temporarily holds calculation data while the calculation is performed.

The HDD 540 is a device storing an OS (Operating System) that is basic software, an application program related to the embodiments, plug-ins for function enhancement, and the like along with related data.

The communication interface 550 is an interface device for performing information communication with other devices having a communication control function. The display device 560, which includes an LCD (Liquid Crystal Display) and the like, is a device that functions as a user interface in which various settings are performed when a user uses functions included in the test servers 200 and 300.

Each unit included in the test servers 200 and 300 may be realized by the CPU 510 executing programs stored in the ROM 520 or the HDD 540 and corresponding to each unit, or may be realized by hardware which executes processing related to each unit.

Although the embodiments of the present invention have been described in detail, the present invention is not limited to the specific embodiments, and various modifications and changes can be made within the scope of the gist of the present invention described in the claims.

What is claimed is:

1. A computer-readable, non-transitory medium storing therein a test environment creation program that causes a processor included in a first server to execute a procedure in which, in a test system including the first server and a second server where a plurality of virtual machines operate, the first server includes a virtual bridge which, when receiving a packet transmitted from a first virtual machine operating on the first server to the second server, transmits the packet to the second server via a physical interface of the first server, the procedure comprising:

generating a first packet that provides a communication load, by a second virtual machine that is a virtual machine operating on the first server and transmitting the generated first packet to the virtual bridge; and receiving the generated first packet from the virtual bridge, not transmitting the generated first packet to the second server, and terminating the transmission, wherein the generating procedure generates a second load substantially equivalent to a load of hardware included in a device other than the first server and the second server, and wherein the generating procedure generates a load substantially equivalent to a load obtained by subtracting a load caused by performing the load generating procedure from the second load.

2. The computer-readable, non-transitory medium according to claim 1, wherein the receiving procedure includes returning the first packet to the second virtual machine by changing a destination address or discarding the first packet.

3. The computer-readable, non-transitory medium according to claim 2, wherein, in the generating procedure, each of a plurality of the second virtual machines that are virtual machines operating on the first server generates the first packet that provides a communication load and transmit the first packet to the virtual bridge, and wherein the receiving procedure receives the first packet from the virtual bridge, does not transmit the first packet to the second server, returns the first packet to another second virtual machine different from the second virtual machine that transmits the first packet by changing the destination address, and terminates the transmission.

4. The computer-readable, non-transitory medium according to claim 1, wherein the generating procedure further generates a CPU load and a memory load.

5. The computer-readable, non-transitory medium according to claim 4, wherein the communication load, the CPU load, and the memory load are based on statistics information obtained when the second virtual machine operates on an operational system.

6. The computer-readable, non-transitory medium according to claim 1, wherein the receiving procedure adjusts the communication load provided by the first packet.

7. A test environment creation method which is performed by a processor included in a first server and in which, in a test system including the first server and a second server where a plurality of virtual machines operate, the first server includes a virtual bridge which, when receiving a packet transmitted from a first virtual machine that is a virtual machine operating on the first server to the second server, transmits the packet to the second server via a physical interface of the first server, the method comprising:

generating a first packet that provides a communication load, by a second virtual machine that is a virtual machine operating on the first server and transmitting the generated first packet to the virtual bridge; and receiving the generated first packet from the virtual bridge, not transmitting the generated first packet to the second server, and terminating the transmission, wherein the generating procedure generates a second load substantially equivalent to a load of hardware included in a device other than the first server and the second server, and wherein the generating procedure generates a load substantially equivalent to a load obtained by subtracting a load caused by performing the load generating procedure from the second load.

8. The method according to claim 7, wherein the receiving procedure includes returning the first packet to the second virtual machine by changing a destination address or discarding the first packet.

9. The method according to claim 8, wherein, in the generating procedure, each of a plurality of the second virtual machines that are virtual machines operating on the first server generates the first packet that provides a communication load and transmits the first packet to the virtual bridge, and wherein the receiving procedure receives the first packet from the virtual bridge, does not transmit the first packet to the second server, returns the first packet to another second virtual machine different from the second virtual machine that transmits the first packet by changing a destination address, and terminates the transmission.

10. The method according to claim 7, wherein the generating procedure further generates a CPU load and a memory load.

11. A device comprising:

a virtual bridge which, when receiving a packet transmitted from a virtual machine that operates on the device to a computer connected via a network, transmits the packet to the computer via a physical interface of a test device;

a load generating unit to generate a first packet that provides a communication load and transmits the generated first packet to the virtual bridge; and a return unit to return the generated first packet from the virtual bridge, not transmit the generated first packet to the computer, and terminating the transmission, wherein the load generating unit generates a second load substantially equivalent to a load of hardware included in a device other than a first server and a second server, and wherein the load generating unit generates a load substantially equivalent to a load obtained by subtracting a load caused by performing the load generating procedure from the second load.

12. The device according to claim 11, wherein the return unit returns the first packet to a second virtual machine by changing a destination address or discards the first packet.

13. The device according to claim 12, wherein each of a plurality of the load generating units generates the first packet that provides a communication load and transmits the first packet to the virtual bridge, and wherein the return unit receives the first packet from the virtual bridge, does not transmit the first packet to a second server, returns the first packet to another load generating unit different from the load generating unit that transmits the first packet by changing a destination address, and terminates the transmission.

14. The device according to claim 11, wherein the load generating unit further generates a CPU load and a memory load.

15. The device according to claim 14, wherein the communication load, the CPU load, and the memory load are based on statistics information obtained when a virtual machine corresponding to the load generating unit operates on an operational system.

16. A device comprising:
a processor, the processor being configured to:
- upon receipt of a packet transmitted from a virtual machine that operates on the device to a computer connected via a network, transmit the packet to the computer via a physical interface of a test device;
- generate a first packet that provides a communication load and transmit the generated first packet to a virtual bridge; and
- receive the generated first packet from the virtual bridge, not transmit the generated first packet to the computer, return the first packet to a second virtual machine by changing a destination address, and terminate the transmission,
- wherein the generating generates a second load substantially equivalent to a load of hardware included in a device other than a first server and a second server, and
- wherein the generating generates a load substantially equivalent to a load obtained by subtracting a load caused by the generating from the second load.

* * * * *